(12) United States Patent
Hayasaka et al.

(10) Patent No.: US 10,861,488 B2
(45) Date of Patent: Dec. 8, 2020

(54) DISK DEVICE HAVING FIRST AND SECOND ACTUATOR ASSEMBLIES

(71) Applicants: Kabushiki Kaisha Toshiba, Tokyo (JP); Toshiba Electronic Devices & Storage Corporation, Tokyo (JP)

(72) Inventors: Kenji Hayasaka, Shinagawa Tokyo (JP); Hisashi Hasegawa, Yokohama Kanagawa (JP)

(73) Assignees: Kabushiki Kaisha Toshiba, Tokyo (JP); Toshiba Electronic Devies & Storage Corporation, Tokyo (JP)

( * ) Notice: Subject to any disclaimer, the term of this patent is extended or adjusted under 35 U.S.C. 154(b) by 0 days.

(21) Appl. No.: 16/532,744

(22) Filed: Aug. 6, 2019

(65) Prior Publication Data

US 2020/0302958 A1  Sep. 24, 2020

(30) Foreign Application Priority Data

Mar. 19, 2019  (JP) .................. 2019-051564

(51) Int. Cl.
  *G11B 5/48* (2006.01)
(52) U.S. Cl.
  CPC ........ *G11B 5/4813* (2013.01); *F16C 2370/12* (2013.01)
(58) Field of Classification Search
  CPC .................................................. G11B 5/4813
  USPC ...................................................... 360/264.4
  See application file for complete search history.

(56) References Cited

U.S. PATENT DOCUMENTS

| | | | | |
|---|---|---|---|---|
| 5,805,386 A * | 9/1998 | Faris | ................... | G11B 5/4813 360/264.4 |
| 6,191,924 B1 * | 2/2001 | Koester | ................ | G11B 5/4813 360/250 |
| 6,449,130 B1 * | 9/2002 | Koyama | .............. | G11B 5/4813 360/264.4 |
| 6,560,075 B2 | 5/2003 | Price et al. | | |
| 6,603,640 B1 * | 8/2003 | Prater | ..................... | F16C 19/54 360/264.4 |
| 6,847,504 B1 * | 1/2005 | Bennett | ................ | G11B 5/4833 360/77.02 |
| 7,031,115 B1 * | 4/2006 | Gilovich | .............. | G11B 5/4806 360/264.4 |
| 10,186,286 B2 * | 1/2019 | Keshavan | ............ | G11B 5/4813 |
| 10,186,287 B2 * | 1/2019 | Keshavan | ............ | G11B 5/5521 |
| 10,192,575 B1 * | 1/2019 | Resh | ..................... | G11B 5/4813 |
| 10,276,194 B2 * | 4/2019 | Keshavan | ........... | G11B 5/4813 |
| 10,332,555 B1 * | 6/2019 | Keshavan | .......... | G11B 19/2018 |

(Continued)

FOREIGN PATENT DOCUMENTS

JP  2006-316915 A  11/2006

*Primary Examiner* — Jefferson A Evans
(74) *Attorney, Agent, or Firm* — White & Case LLP

(57) ABSTRACT

According to one embodiment, a disk device includes a first actuator assembly on a support shaft via a first bearing unit, and a second actuator assembly on the support shaft via a second bearing unit. The first bearing unit includes a first shaft on the support shaft, a first sleeve fixed to the first actuator block, and a bearing between the first shaft and the first sleeve. The second bearing unit includes a second shaft on the support shaft, separated from the first shaft, a second sleeve fixed to the second actuator block, and a bearing between the second shaft and the second sleeve. One axial end of the first shaft faces one axial end of the second shaft.

8 Claims, 14 Drawing Sheets

(56) References Cited

U.S. PATENT DOCUMENTS

| | | | |
|---|---|---|---|
| 10,446,180 B1* | 10/2019 | Kraus | G11B 5/4813 |
| 10,482,911 B1* | 11/2019 | Nanjunda Swamy | |
| | | | G06F 11/2084 |
| 10,522,175 B1* | 12/2019 | Horgan | G11B 5/4813 |
| 10,657,993 B1* | 5/2020 | Uehara | G11B 25/043 |
| 2002/0039259 A1 | 4/2002 | Koyama et al. | |
| 2002/0060885 A1* | 5/2002 | Money | G11B 5/5521 |
| | | | 360/264.4 |
| 2002/0149884 A1* | 10/2002 | Price | G11B 5/4813 |
| | | | 360/265.2 |
| 2019/0287557 A1* | 9/2019 | Akatsuka | G11B 5/4813 |
| 2019/0287558 A1* | 9/2019 | Hasegawa | G11B 5/4813 |
| 2019/0295578 A1* | 9/2019 | Kraus | G11B 5/4813 |

* cited by examiner

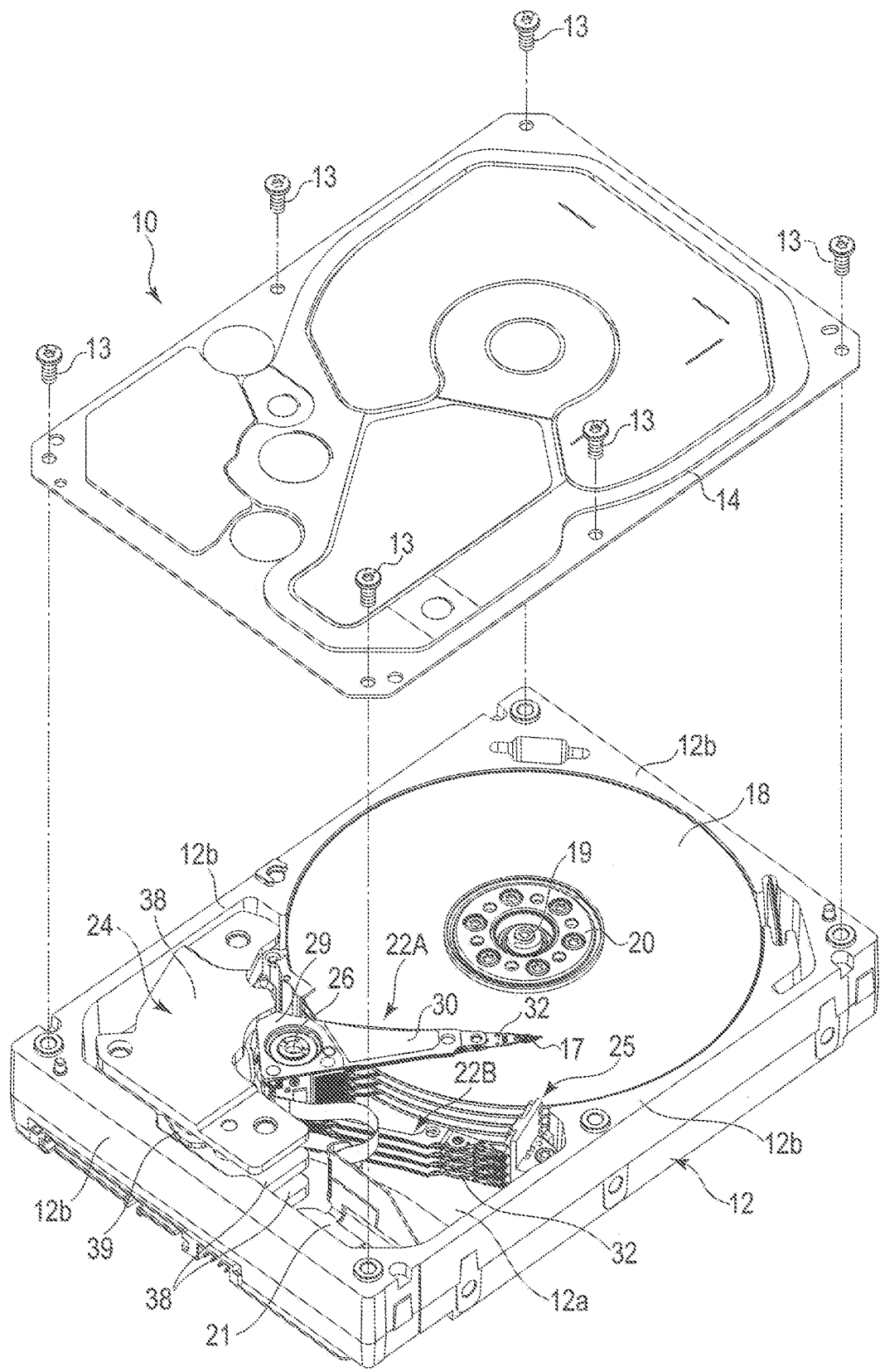
F I G. 1

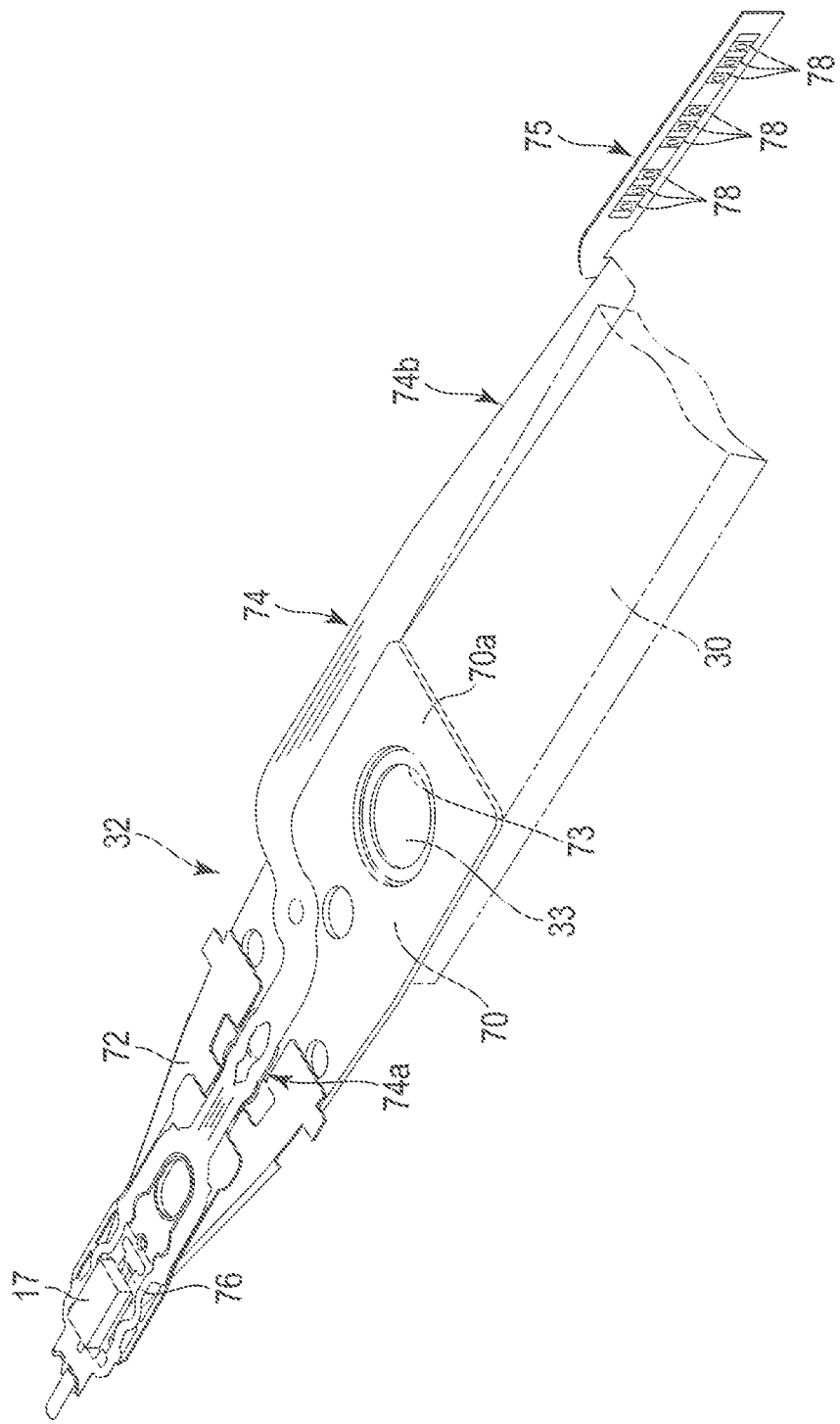
F I G. 4

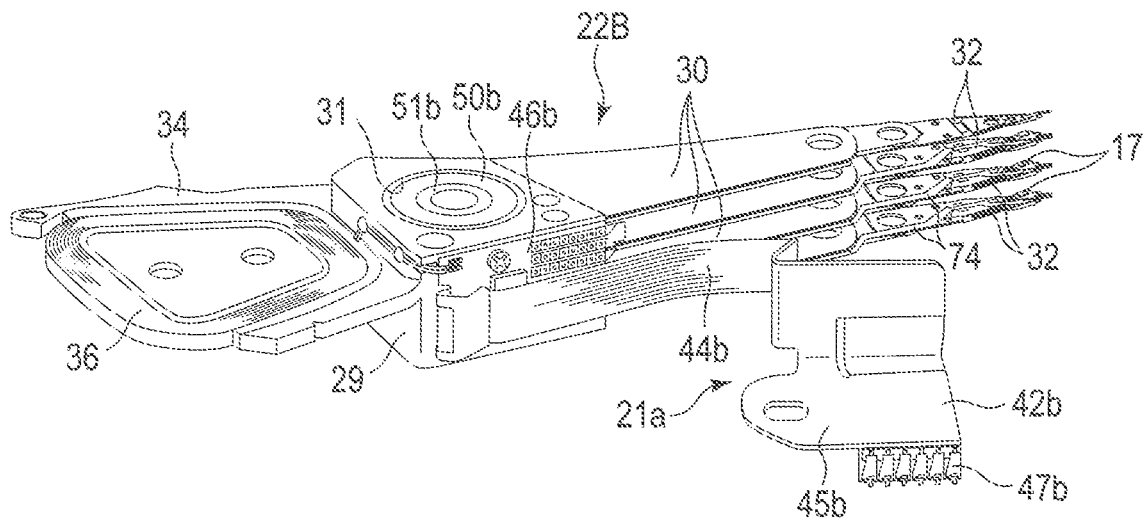
F I G. 8D
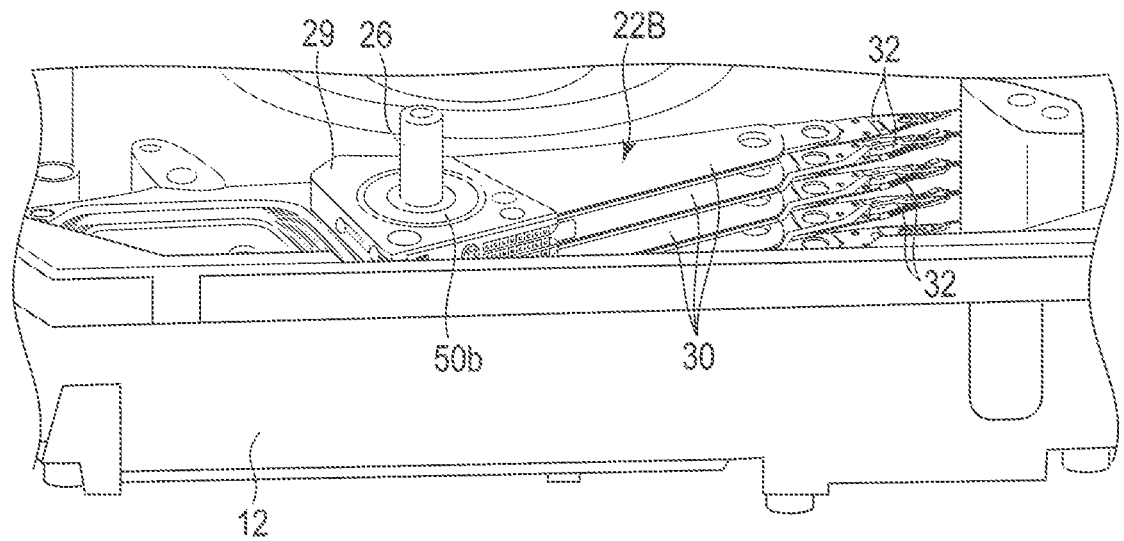
F I G. 8E

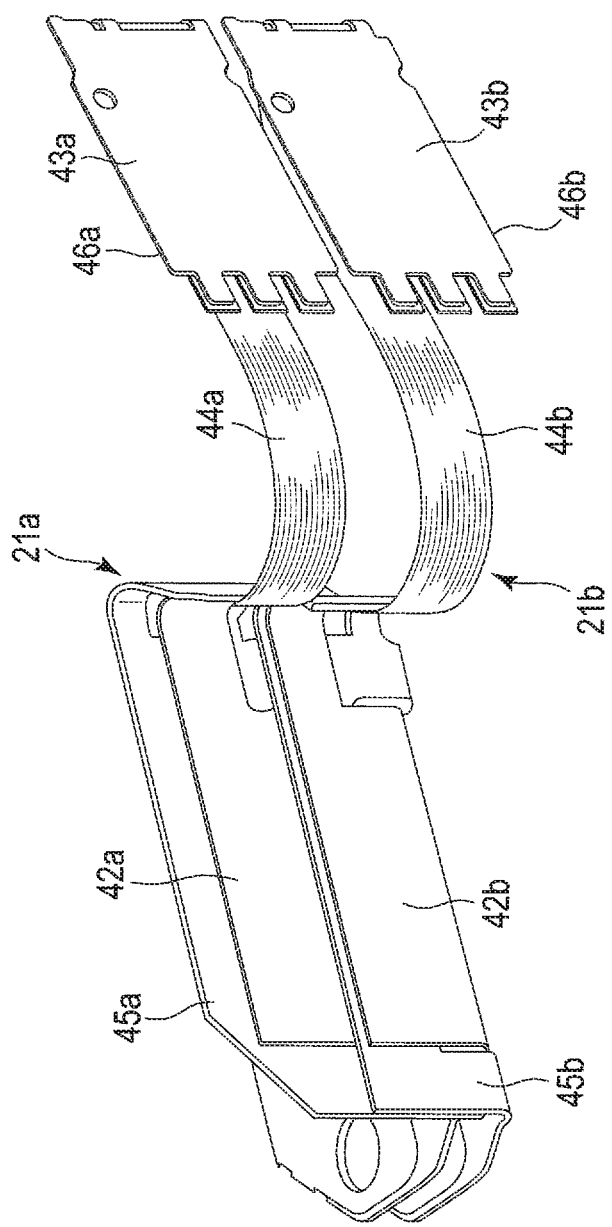
F I G. 13

US 10,861,488 B2

DISK DEVICE HAVING FIRST AND SECOND ACTUATOR ASSEMBLIES

CROSS-REFERENCE TO RELATED APPLICATIONS

This application is based upon and claims the benefit of priority from Japanese Patent Application No. 2019-051564, filed Mar. 19, 2019, the entire contents of which are incorporated herein by reference.

FIELD

Embodiments described herein relate generally to a disk device.

BACKGROUND

As a disk device, for example, a hard disk drive (HDD) comprises magnetic disks provided in a housing, a spindle motor which supports the magnetic disks and rotates the magnetic disks, a head actuator which supports magnetic heads, a voice coil motor which drives the head actuator, a flexible printed circuit unit, and the like.

The head actuator comprises an actuator block having a plurality of arms, and a unit bearing mounted in a mounting hole of the actuator block. On each arm, one or two suspension assemblies (referred to also as head gimbal assemblies (HGA)) each of which supports the magnetic head are mounted. The unit bearing is composed of, for example, a combination of a hollow shaft, a plurality of ball bearings, a spacer, a sleeve, and the like.

Recently, the number of magnetic disks installed has been increasing with the increasing storage capacity of the HDD. To handle a large number of magnetic disks, the so-called split actuator in which a head actuator is split into several, for example, two independently rotatable head actuators and these two head actuators are stacked one on top of the other has been proposed. The actuator block of one head actuator is supported so as to be rotatable around a support shaft. The actuator block of the other head actuator is supported so as to be rotatable around the support shaft and is arranged so as to overlap the actuator block of one head actuator in an axial direction.

In the above-described split actuator, two unit bearings provided in two actuator assemblies share a common hollow shaft, and are substantially integrated with each other. In this case, at the time of assembling the split actuator, the actuator blocks of two actuator assemblies are attached to the integrated upper and lower unit bearings in order. At this time, the gap between the actuator blocks needs to be determined with high accuracy. To achieve high dimensional accuracy, the positioning mechanism becomes complicated and the assembling work becomes troublesome.

BRIEF DESCRIPTION OF THE DRAWINGS

FIG. 1 is an exploded perspective view showing a hard disk drive (HDD) according to the first embodiment from which a top cover is removed.

FIG. 4 is a perspective view showing a head suspension assembly of the actuator assembly.

FIG. 8D is a perspective view showing an assembling step of the first actuator assembly.

FIG. 8E is a perspective view showing an assembling step of the first actuator assembly.

FIG. 13 is a perspective view showing the FPC unit of the actuator assembly according to the fourth modification example.

DETAILED DESCRIPTION

Figure 2:
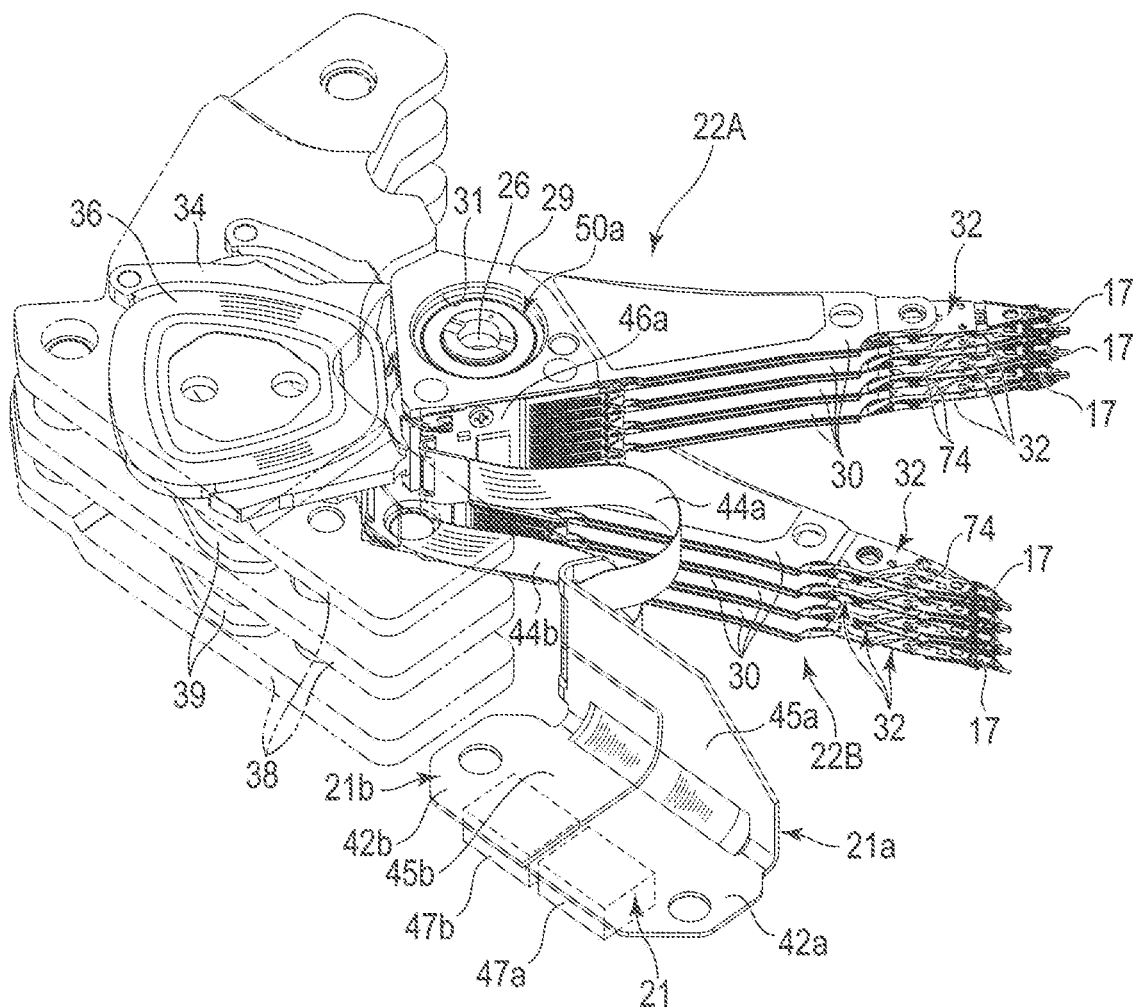
FIG. 2 is a perspective view showing an actuator assembly and a wiring substrate unit of the HDD.

Various embodiments will be described hereinafter with reference to the accompanying drawings. In general, according to one embodiment, a disk device comprises a plurality of disk-shaped recording media, a first actuator assembly which comprises a first bearing unit, a first actuator block rotatably supported on a support shaft via the first bearing unit, arms and suspension assemblies extending from the first actuator block, and magnetic heads supported on the suspension assemblies, and a second actuator assembly which comprises a second bearing unit, a second actuator block rotatably supported on the support shaft via the second bearing unit, arms and suspension assemblies extending from the second actuator block, and magnetic heads supported on the suspension assemblies. The first bearing unit comprises a first shaft mounted on the support shaft, a first sleeve fixed to the first actuator block and arranged around the first shaft, and at least one bearing arranged between the first shaft and the first sleeve. The second bearing unit comprises a second shaft mounted on the support shaft and separated from the first shaft, a second sleeve fixed to the second actuator block and arranged around the second shaft, and at least one bearing arranged between the second shaft and the second sleeve, and one end in an axial direction of the first shaft faces one end in an axial direction of the second shaft.

The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes, etc., of the respective parts are illustrated schematically in the drawings, rather than as an accurate representation of what is implemented. However, such schematic illustration is merely exemplary, and in no way restricts the interpretation of the invention. In addition, in the specification and drawings, the same elements as those described in connection with preceding drawings are denoted by the same reference numbers, and detailed description thereof is omitted unless necessary.

First Embodiment

As a disk device, a hard disk drive (HDD) according to the first embodiment will be described in detail.

FIG. 1 is an exploded perspective view of the HDD according to the first embodiment from which a top cover is removed.

The HDD comprises a housing 10 having a flat and substantially rectangular shape. The housing 10 comprises a base 12 having the shape of a rectangular box which is open on its upper surface side, and a top cover 14. The top cover 14 is screwed on the base 12 by a plurality of screws 13, and closes the upper opening of the base 12. The base 12 comprises a rectangular bottom wall 12a facing the top cover 14 across a gap, and sidewalls 12b standing along the peripheral edges of the bottom wall, and is integrally formed of aluminum, for example. The top cover 14 has the shape of a rectangular plate and is formed of stainless steel, for example. The top cover 14 is screwed on the sidewalls 12b of the base 12 and closes the upper opening of the base 12.

Several, for example, seven magnetic disks 18 as recording media, and a spindle motor 19 as a drive unit which supports and rotates the magnetic disks 18 are provided in the housing 10. The spindle motor 19 is provided on the bottom wall 12a. Each magnetic disk 18 has a diameter of 96 mm (about 3.5 inches), for example, and comprises a magnetic recording layer on its upper surface and/or lower surface. The magnetic disks 18 are coaxially fitted in a hub (not shown) of the spindle motor 19, clamped by a clamp spring 20, and thereby fixed to the hub. In one example, seven magnetic disks 18 are stacked parallel to one another with a predetermined gap in between. In addition, the magnetic disks 18 are supported in a state of being positioned parallel to the base wall 12a of the base 12. The magnetic disks 18 are rotated at a predetermined rotation rate by the spindle motor 19.

Note that the number of magnetic disks is not limited seven and can be increased or decreased.

A plurality of magnetic heads 17 which record information on and reproduce information from the magnetic disks 18, and a head actuator assembly which supports the magnetic heads 17 such that the magnetic heads 17 are movable with respect to the magnetic disks 18 are provided in the housing 10. In the embodiment, the head actuator assembly is configured as a split actuator assembly which is split into a plurality of actuator assemblies, for example, into a first actuator assembly 22A and a second actuator assembly 22B. The first and second actuator assemblies 22A and 22B are supported so as to be rotatable around a common support shaft (pivot shaft) 26 standing on the bottom wall 12a of the base 12.

A voice coil motor (VCM) 24 which rotates and positions the first and second actuator assemblies 22A and 22B, a ramped loading mechanism 25 which holds the magnetic heads 17 at an unloading position away from the magnetic disks 18 when the magnetic heads 17 move to the outermost circumferences of the magnetic disks 18, and a wiring substrate unit (FPC unit) 21 on which an electronic component such as a conversion connector are mounted are provided in the housing 10.

A printed circuit board (not shown) is screwed on the outer surface of the bottom wall 12a. The printed circuit board constitutes a control unit, and the control unit controls the operation of the spindle motor 19 and controls the operations of the VCM 24 and the magnetic heads 17 via the wiring substrate unit 21.

Figure 3:
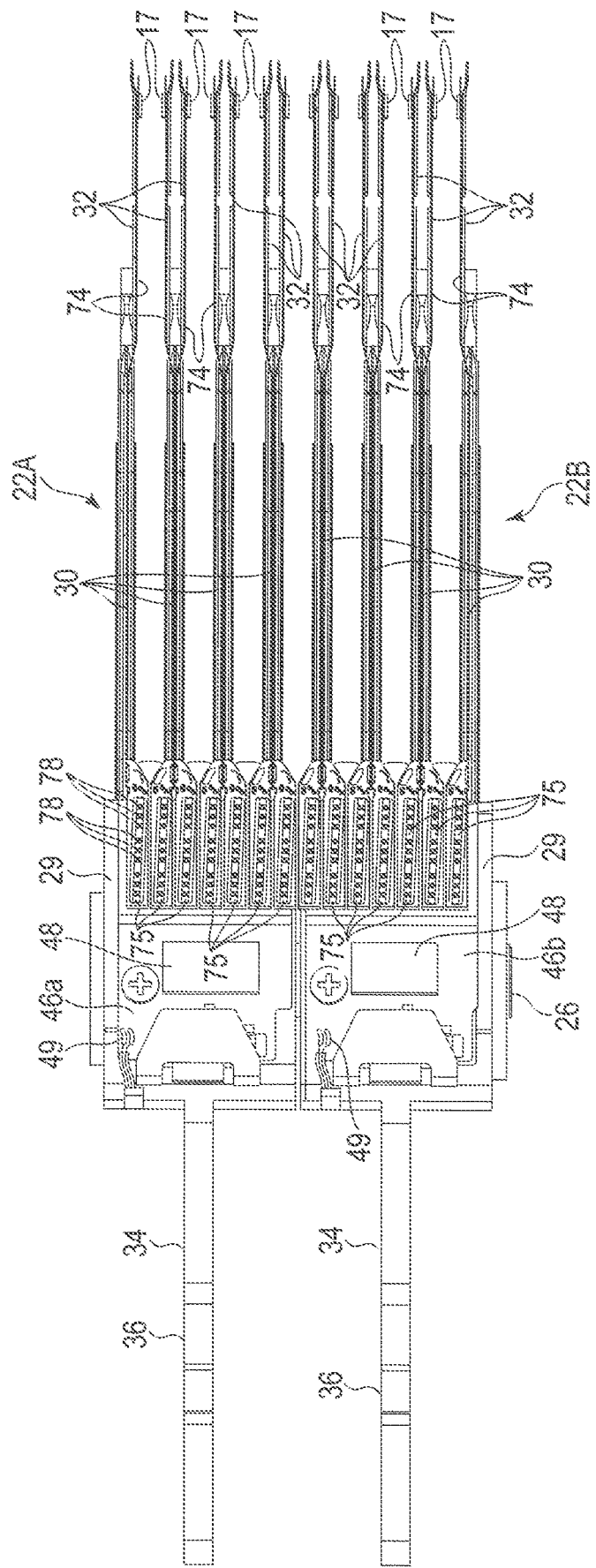
FIG. 3 is a side view showing the actuator assembly in an aligned state.

FIG. 2 is a perspective view showing the head actuator assembly comprising the split actuator assembly and the FPC unit, and FIG. 3 is a side view showing the split actuator assembly in an aligned state.

As shown in FIGS. 2 and 3, the split actuator assembly comprises the first actuator assembly 22A and the second actuator assembly 22B. The first and second actuator assemblies 22A and 22B are arranged so as to overlap, and are provided so as to be independently rotatable around the common support shaft 26 standing on the bottom wall 12a of the base 12. The first actuator assembly 22A and the second actuator assembly 22B have substantially the same structure. In one example, the actuator assembly arranged on the upper side is the first actuator assembly 22A and the actuator assembly arranged on the lower side is the second actuator assembly 22B.

The first actuator assembly 22A comprises a first bearing unit (unit bearing) 50a, an actuator block (first actuator block) 29, four arms 30 extending from the actuator block 29, head suspension assemblies (referred to also as head gimbal assemblies (HGA)) 32 mounted on the arms 30, and magnetic heads 17 supported on the head suspension assemblies. The actuator block 29 has an inner hole 31, and the first bearing unit 50a is mounted in the inner hole 31. The actuator block 29 is rotatably supported on the support shaft 26 by the first bearing unit 50a. The configuration of the first bearing unit 50a will be described later.

In the embodiment, the actuator block 29 and the four arms 30 are integrally molded of aluminum, etc., and constitute the so-called E-block. The arms 30 have the shape of a long thin flat plate, for example, and extend from the actuator block 29 in a direction orthogonal to the support shaft 26. The four arms 30 are provided parallel to each other with a gap in between.

The first actuator assembly 22A comprises a support frame 34 extending from the actuator block 29 in a direction opposite to the direction of the arms 30. A voice coil 36 is supported on the support frame 34. As shown in FIGS. 1 and 2, the voice coil 36 is located between a pair of yokes 38 installed in the base 12, and the yokes 38 and a magnet 39 fixed to one of the yokes 38 constitute a VCM 24.

As shown in FIGS. 2 and 3, the first actuator assembly 22A comprises seven head suspension assemblies 32, and the head suspension assemblies 32 are mounted on the extending ends of the arms 30. The head suspension assemblies 32 include an uphead head suspension assembly supporting a magnetic head 17 such that the magnetic head 17 faces upward and a downhead head suspension assembly supporting a magnetic head 17 such that the magnetic head 17 faces downward. As these uphead and downhead suspension assemblies, head suspension assemblies of the same structure are arranged by changing the upside and the downside. In the embodiment, in the first actuator assembly 22A, a downhead suspension assembly is mounted on the uppermost arm 30, and two head suspension assemblies 32, which are an uphead suspension assembly and a downhead suspension assembly, are attached to each of the other three arms 30.

The seven head suspension assemblies 32 extend from the four arms 30, and are arranged substantially parallel to each other with a predetermined gap in between. Two magnetic heads 17 supported on each of the three pairs of downhead suspension assemblies and uphead suspension assemblies other than the lowermost downhead suspension assembly 32 face each other across a predetermined gap. These magnetic heads 17 are positioned so as to face both surfaces of the corresponding magnetic disk 18. Note that the magnetic head 17 of the lowermost downhead suspension assembly 32 is positioned so as to face the upper surface of the magnetic disk 18 arranged between the magnetic head 17 of the lowermost downhead suspension assembly 32 of the first actuator assembly 22A and the uppermost uphead suspension assembly 32 of the second actuator assembly 22B which will be described later.

FIG. 4 is a perspective view showing one example of the head suspension assembly. As shown in the drawing, the head suspension assembly 32 comprises a base plate 70 having a substantially rectangular shape, a load beam 72 having the shape of a long thin plate spring, and a flexure (wiring member) 74 having the shape of a long thin belt. In the load beam 72, the proximal end portion is overlaid on and fixed to an end portion of the base plate 70. The load beam 72 extends from the base plate 70 and tapers down toward the extending end. The base plate 70 and the load beam 72 are formed of stainless steel, for example. In one example, the thickness of the base plate 70 is about 150 μm and the thickness of the load beam 72 is about 25 to 30 μm.

The base plate 70 comprises a circular opening 33 in the proximal end portion, and a ring-shaped projection 73 around the opening 33. In the base plate 70, the proximal side is overlaid on the distal end portion of the arm 30. The base plate 70 is fasten to the distal end portion of the arm 30 by fitting the projection 73 of the base plate 70 in a swaging hole formed in the arm 30, and swaging the projection 73.

The proximal end portion of the load beam 72 is overlaid on the distal end portion of the base plate 70 and is fixed to the base plate 70 by welding a plurality of portions.

The flexure 74 comprises a metal plate (lining layer) of stainless steel, etc., an insulating layer formed on the metal plate, a conductive layer formed on the insulating layer and constituting a plurality of wiring lines (wiring patterns), and a cover layer (protective layer, insulating layer) covering the conductive layer, and constitutes a long thin multilayer plate. The flexure 74 comprises a distal portion 74a and a proximal portion 74b. The distal portion 74a is mounted on the surface of the load beam 72 and the surface of the base plate 70. The proximal portion 74b extends outward from a side edge of the base plate 70 and further extends along the arm 30 to the proximal end portion of the arm 30.

A part of the distal portion 74a constitutes a displaceable gimbal portion (elastic supporting portion) 76. The gimbal portion 76 is located on the load beam 72. The magnetic head 17 is mounted on the gimbal portion 76. The wiring lines of the flexure 74 are electrically connected to a read element, a write element, a heater and other members of the magnetic head 17.

After extending outward from the side edge of the base plate 70, the proximal portion 74b of the flexure 74 passes through a slit formed on a side surface of the arm 30 and extends to the proximal end of the arm 30 and the actuator block 29. A connecting end portion (tail connecting terminal portion) 75 of the flexure 74 is formed at the rear end of the proximal portion 74b. The connecting end portion 75 has a long thin rectangular shape. The connecting end portion 75 is bent at a substantially right angle with respect to the proximal portion 74b and is positioned substantially perpendicularly with respect to the arm 30.

Several, for example, nine connecting terminals (connecting pads) 78 are provided in the connecting end portion 75. The connecting terminals 78 are connected to the wiring lines of the flexure 74, respectively. That is, the wiring lines of the flexure 74 extend over almost the entire length of the flexure 74, one ends are electrically connected to the magnetic head 17, and the other ends are electrically connected to the connecting terminals 78.

As shown in FIG. 3, seven connecting end portions 75 are connected to a connecting portion (wiring substrate) 46 of a flexible printed circuit (FPC) provided on a mounting surface of the actuator block 29. The connecting terminals 78 of each connecting end portion 75 are soldered to connecting terminals (not shown) provided in the connecting portion 46, and are electrically and mechanically connected to the connecting portion 46. Seven connecting end portions 75 are arranged in the axial direction of the support shaft 26, and are arranged side by side and substantially parallel to each other.

On the other hand, the second actuator assembly 22B has substantially the same configuration as the first actuator assembly 22A. That is, as shown in FIGS. 2, 3 and 4, the second actuator assembly 22B comprises a second bearing unit (unit bearing) 50b (as described later), an actuator block (second actuator block) 29 in which the second bearing unit 50b is incorporated, four arms 30 extending from the actuator block 29, seven head suspension assemblies 32 mounted on the arms 30, magnetic heads 17 mounted respectively on the head suspension assemblies, and a support frame 34 supporting a voice coil 36.

The actuator block 29 is rotatably supported on the support shaft 26 via the second bearing unit 50b. The actuator block (second actuator block) 29 is supported on the proximal end portion (half on the bottom wall 12a side) of the support shaft 26, and is coaxially arranged below the first actuator block 29. The actuator block (second actuator block) 29 faces the first actuator block 29 across a small gap.

In the second actuator assembly 22B, an uphead suspension assembly 32 is mounted on the lowermost arm 30, and two head suspension assemblies, which are an uphead suspension assembly 32 and a downhead suspension assembly 32, are attached to the other three arms 30. The voice coil 36 of the second actuator assembly 22B is located between a pair of yokes 38 installed in the base 12, and the yokes 38 and a magnet 39 fixed to one of the yokes 38 constitute a VCM 24.

The VCM 24 driving the first actuator assembly 22A and the VCM 24 driving the second actuator assembly 22B are independently provided. Consequently, the first actuator assembly 22A and the second actuator assembly 22B can be independently driven (rotated).

Figure 5:
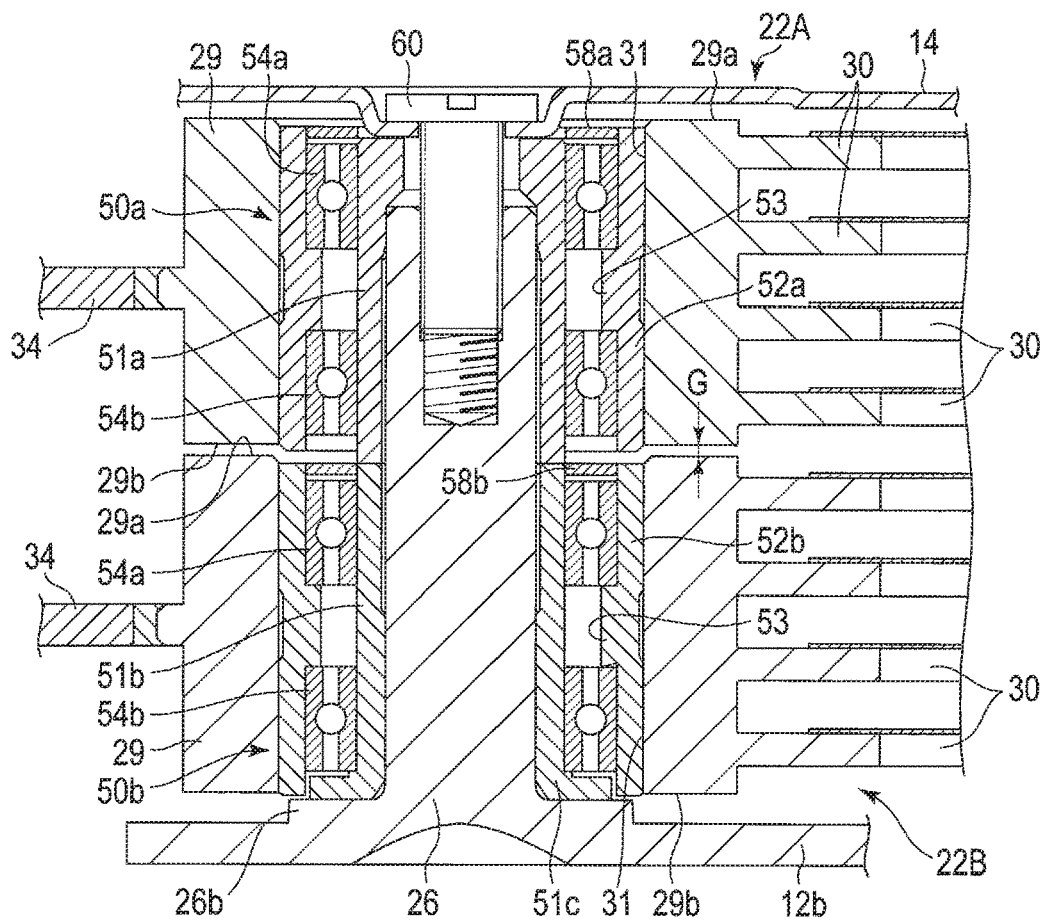
FIG. 5 is a cross-sectional view showing an actuator block and a bearing unit portion of the actuator assembly.

Next, the configuration of the bearing unit 50 of the actuator assembly will be described. FIG. 5 is a cross-sectional view showing the actuator block and the bearing unit.

In the following description, "first" will be added to a constituent element of the first actuator assembly 22A and "second" will be added to a constituent element of the second actuator assembly 22B.

As shown in FIG. 5, the first bearing unit 50a of the first actuator assembly 22A and the second bearing unit 50b of the second actuator assembly 22B are configured as separate independent bearing units, and are separately mounted in the first actuator block 29 and the second actuator block 29.

More specifically, the support shaft 26 stands on the bottom wall 12a of the base 12. In one example, the support shaft 26 is integrally molded with the bottom wall 12a and stands substantially perpendicularly with respect to the bottom wall 12a. The support shaft 26 integrally comprises an annular flange (pedestal) 26b provided on the outer periphery of the proximal end.

Each of the first and second actuator blocks 29 of the first and second actuator assemblies 22A and 22B has an upper end surface 29a and a lower end surface 29b which extend orthogonally with respect to the support shaft 26. The inner hole 31 penetrates the actuator block 29 and opens at the upper end surface 29a and the lower end surface 29b. In addition, the inner hole 31 is coaxially formed with the support shaft 26.

The first bearing unit 50a comprises a first hollow shaft 51a having a substantially cylindrical shape, a first sleeve 52a having a substantially cylindrical shape and coaxially arranged around the first hollow shaft 51a, and several, for example, two ball bearings 54a and 54b fitted between the first hollow shaft 51a and the first sleeve 52a.

The inner diameter of the first hollow shaft 51a is slightly greater than the outer diameter of the support shaft 26. However, the inner diameter of the upper end portion in the axial direction of the first hollow shaft 51a is less than the outer diameter of the support shaft 26.

The first sleeve 52a has a length in the axial direction substantially equal to the height of the first actuator block 29. The outer diameter of the first sleeve 52a is substantially equal to the diameter of the inner hole 31. The inner diameter of the first sleeve 52a is greater than the outer diameter of the first hollow shaft 51a. The first sleeve 52a integrally comprises a ring-shaped projection 53 projecting toward the center of the shaft from a middle portion in the axial direction of the inner peripheral surface. The first sleeve 52a is slightly deviated to one side in the axial direction, i.e., upward in this example from the first hollow shaft 51a. Consequently, the upper end of the first hollow shaft 51a is slightly deviated downward from the upper end of the first sleeve 52a, and the lower end of the first hollow shaft 51a slightly projects downward from the lower end of the first sleeve 52a.

One ball bearing 54a is arranged inside the upper end portion of the first sleeve 52a in a state where the inner race is fitted to the outer peripheral surface of the first hollow shaft 51a and the outer race is fitted to the inner peripheral surface of the first sleeve 52a. The other ball bearing 54b is arranged inside the lower end portion of the first sleeve 52a in a state where the inner race is fitted to the outer peripheral surface of the first hollow shaft 51a and the outer race is fitted to the inner peripheral surface of the first sleeve 52a. The projection 53 is located between the ball bearings 54a and 54b and functions as a spacer.

An annular cap 58a is mounted on the inner periphery of the upper end portion of the first sleeve 52a. The cap 58a faces the upper ball bearing 54a across a small gap. The cap 58a functions as a cover which prevents scattering of grease from the ball bearing 54a.

The first sleeve 52a of the first bearing unit 50a configured as described above is fitted into the inner hole 31 of the first actuator block 29 and is fixed to the first actuator block 29 by adhesive, etc. The first sleeve 52a is coaxially located with the inner hole 31, and the upper end and the lower end in the axial direction are substantially aligned with the upper end surface 29a and the lower end surface 29b of the first actuator block 29. The lower end portion in the axial direction of the first hollow shaft 51a slightly projects downward from the lower end surface 29b of the first actuator block 29.

As the first hollow shaft 51a is fitted to the upper end portion of the support shaft 26, the first bearing unit 50a mounted in the first actuator block 29 is mounted on the support shaft 26.

On the other hand, the second bearing unit 50b of the second actuator assembly 22B has substantially the same structure as the first bearing unit 50a of the first actuator assembly 22A. The second actuator assembly 22B is rotatably supported on the proximal portion of the support shaft 26 via the second bearing unit 50b.

More specifically, the second bearing unit 50b comprises a second hollow shaft 51b having a substantially cylindrical shape, a second sleeve 52b having a substantially cylindrical shape and coaxially arranged around the second hollow shaft 51b, and several, for example, two ball bearings 54a and 54b fitted between the second hollow shaft 51b and the second sleeve 52b.

The inner diameter of the second hollow shaft 51b is slightly greater than the outer diameter of the support shaft 26. However, the inner diameter of the lower half in the axial direction of the second hollow shaft 51b is substantially equal to the outer diameter of the support shaft 26. The second hollow shaft 51b integrally comprises an annular flange 51c provided on the outer periphery of the lower end in the axial direction.

The second sleeve 52b has a length in the axial direction substantially equal to the height of the second actuator block 29. The outer diameter of the second sleeve 52b is substantially equal to the diameter of the inner hole 31. The inner diameter of the second sleeve 52b is greater than the outer diameter of the second hollow shaft 51b. The second sleeve 52b integrally comprises a ring-shaped projection 53 projecting toward the center of the shaft from a middle portion in the axial direction of the inner peripheral surface. The upper end and the lower end in the axial direction of the second sleeve 52b are substantially aligned with the upper end and the lower end in the axial direction of the second hollow shaft 51b.

One ball bearing 54a is arranged in the upper end portion of the second sleeve 52b in a state where the inner race is fitted to the outer peripheral surface of the second hollow shaft 51b and the outer race is fitted to the inner peripheral surface of the second sleeve 52b. The other ball bearing 54b is arranged in the lower end portion of the second sleeve 52b in a state where the inner race is fitted to the outer peripheral surface of the second hollow shaft 51b and the outer race is fitted to the inner peripheral surface of the second sleeve 52b. The projection 53 is located between the ball bearings 54a and 54b and functions as a spacer.

An annular cap 58b is mounted on the inner periphery of the upper end portion of the second sleeve 52b. The cap 58b faces the upper ball bearing 54a across a small gap. The cap 58b functions as a cover which prevents scattering of grease from the ball bearing 54a. In addition, the flange 51c of the second hollow shaft 51b faces the lower ball bearing 54b across a small gap. The flange 51c functions as a cover which prevents scattering of grease from the ball bearing 54b.

The second sleeve 52b of the second bearing unit 50b configured as described above is fitted into the inner hole 31 of the second actuator block 29 and is fixed to the second actuator block 29 by adhesive, etc. The second sleeve 52b is coaxially located with the inner hole 31, and the upper end and the lower end in the axial direction are substantially aligned with the upper end surface 29a and the lower end surface 29b of the second actuator block 29.

The second actuator assembly 22B is rotatably supported on the proximal portion of the support shaft 26 via the second bearing unit 50b. That is, the proximal portion of the support shaft 26 is inserted into the second hollow shaft 51b of the second bearing unit 50b. The second hollow shaft 51b is fitted to the outer peripheral surface of the support shaft 26, and the flange 51c is in contact with the pedestal 26b of the support shaft 26. The second sleeve 52b and the second actuator block 29 are supported so as to be rotatable with respect to the second hollow shaft 51b and the support shaft 26 by the ball bearings 54a and 54b.

The first actuator assembly 22A described above is rotatably supported on the distal portion of the support shaft 26 via the first bearing unit 50a. The distal portion of the support shaft 26 is inserted into the first hollow shaft 51a of the first bearing unit 50a. The first hollow shaft 51a is fitted to the outer peripheral surface of the support shaft 26, and furthermore, the upper end portion in the axial direction of the first hollow shaft 51a extends upward beyond the distal end of the support shaft 26 and is in contact with the distal end of the support shaft 26. The first sleeve 52a and the first actuator block 29 are supported so as to be rotatable with respect to the first hollow shaft 51a and the support shaft 26 by the ball bearings 54a and 54b.

The lower end in the axial direction of the first hollow shaft 51a faces to the upper end in the axial direction of the second hollow shaft 51b. The lower end may be directly in contact with the upper end of the second hollow shaft 51b or may be indirectly in contact with the upper end through a spacer and the like. In the first embodiment, the lower end in the axial direction of the first hollow shaft 51a is directly in contact with the upper end in the axial direction of the second hollow shaft 51b. A fixing screw 60 is screwed to the upper end portion of the support shaft 26 through the inner hole of the first hollow shaft 51a. The head of the fixing screw 60 is in contact with the upper end in the axial direction of the first hollow shaft 51a, and pushes the first hollow shaft 51a and the second hollow shaft 51b toward the pedestal 26b. Consequently, the first bearing unit 50 and the second bearing unit 50 are mounted and fixed at predetermined positions with respect to the support shaft 26. In addition, since the lower end of the first hollow shaft 51a is in contact with the upper end of the second hollow shaft 51b, the first actuator assembly 22A is located at a predetermined position with respect to the second actuator assembly 22B. That is, the first and second actuator assemblies 22A and 22B are positioned such that a predetermined gap G is formed between the lower end surface 29b of the first actuator block 29 and the upper end surface 29a of the second actuator block 29.

Figure 6:
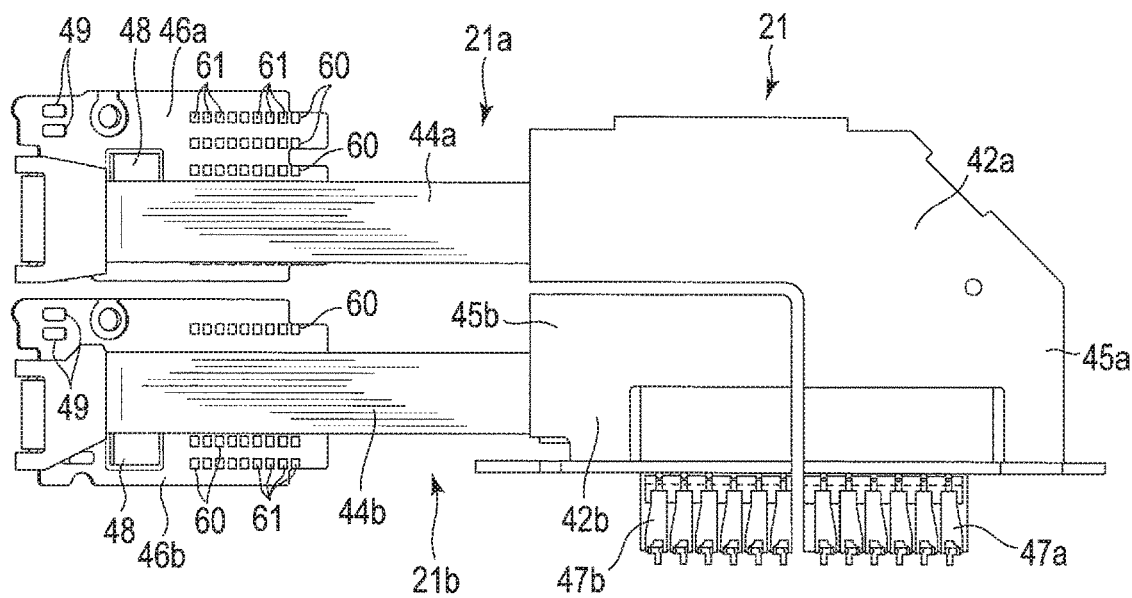
FIG. 6 is a side view showing an FPC unit of the actuator assembly.

Next, the FPC unit 21 of the head actuator assembly will be described in detail. FIG. 6 is a side view of the FPC unit, and FIG. 7 is a perspective view showing the rear surface side of the PFC unit.

Figure 7:
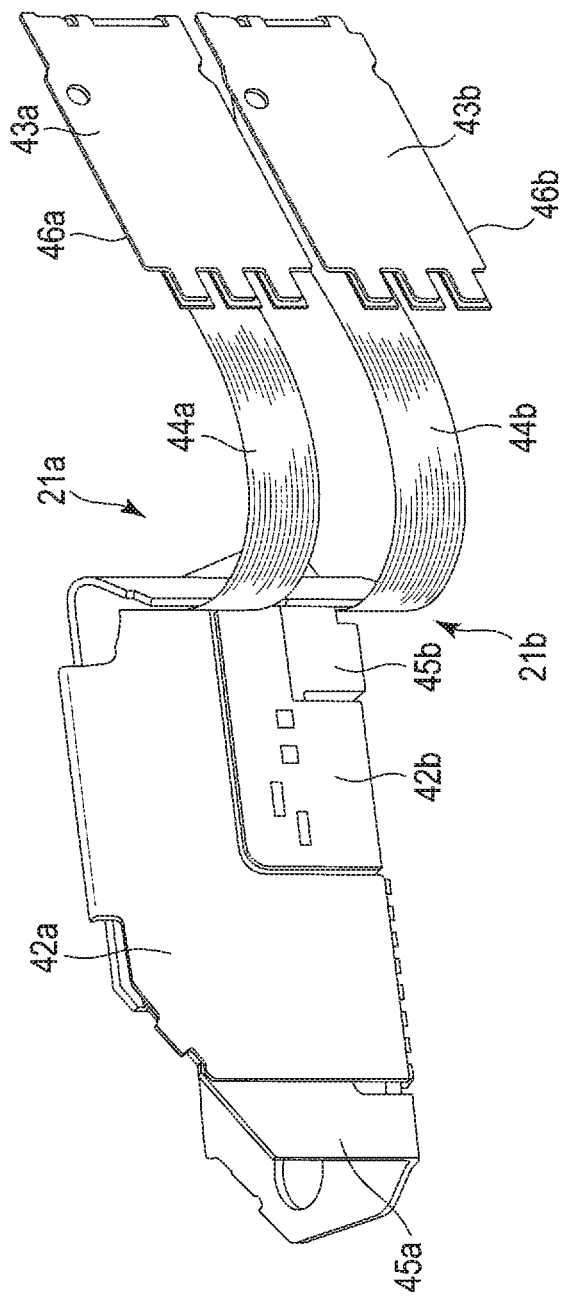
FIG. 7 is a perspective view showing the FPC unit.

As shown in FIGS. 2, 6 and 7, the FPC unit 21 is divided into a first FPC unit 21a connected to the first actuator assembly 22A and a second FPC unit 21b connected to the second actuator assembly 22B.

The first FPC unit 21a integrally comprises a substantially rectangular base portion 42a, a belt-shaped relay portion 44a extending from one side edge of the base portion 42a, and a connecting portion (first wiring substrate) 46a continuously provided at the distal end of the relay portion 44a. The base portion 42a, the relay portion 44a and the connecting portion 46a are formed of a flexible printed circuit board (FPC). The FPC comprises an insulating layer of polyimide, etc., a conductive layer formed on the insulating layer and constituting wiring lines, connecting pads, etc., and a protective layer covering the conductive layer.

Electronic components such as a conversion connector 47a and a plurality of capacitors (not shown) are mounted on the base portion 42a and are electrically connected to the wiring lines of the FPC. A metal plate 45a functioning as a reinforcing plate is bonded to the base portion 42a. The metal plate 45a and the base portion 42a are bent to substantially L-shape. The base portion 42a is installed on the bottom wall 12a of the base 12. The relay portion 44a extends from the side edge of the base portion 42a toward the first actuator assembly 22A. The connecting portion 46a provided at the extending end of the relay portion 44a is bonded to one side surface (mounting surface) of the first actuator block 29 via a lining plate 43a and is fixed to the mounting surface by a fixing screw.

The connecting portion 46a has a rectangular shape slightly smaller than the mounting surface of the first actuator block 29. The connecting portion 46a comprises seven connecting pad groups 60 corresponding to the connecting end portions 75 of the flexures 74. Each connecting pad group 60 comprises, for example, nine connecting pads 61 arranged in line. Each connecting pad 61 is electrically connected to the base portion 42a via the wiring line of the FPC. A head IC (head amplifier) 48 is mounted on the connecting portion 46a, and the head IC 48 is connected to the connecting pads 61 and the base portion 42a via wiring lines. Furthermore, the connecting portion 46a comprises connecting pads 49 connected to the voice coil 36.

As shown in FIGS. 2 and 3, the connecting end portion 75 of each flexure 74 is overlaid on the corresponding connecting pad group 60 of the connecting portion 46a, and nine connecting terminals 78 of the connecting end portion 75 are electrically and mechanically connected to the corresponding connecting pads 61 by solder.

Consequently, seven magnetic heads 17 of the first actuator assembly 22A are electrically connected to the base portion 42a via the wiring lines of the flexures 74, the connecting end portions 75, the connecting portion 46a of the first FPC unit 21a, and the relay portion 44a. Furthermore, the base portion 42a is electrically connected to the printed circuit board on the bottom surface side of the housing 10 via the conversion connector 47a.

As shown in FIGS. 2, 6 and 7, the second FPC unit 21b integrally comprises a substantially rectangular base portion 42b, a belt-shaped relay portion 44b extending from one side edge of the base portion 42b, a connecting portion (second wiring substrate) 46b continuously provided at the distal end of the relay portion 44a. The base portion 42b, the relay portion 44b and the connecting portion 46b are formed of a flexible printed circuit (FPC).

Electronic components such as a conversion connector 47b and a plurality of capacitors (not shown) are mounted on the base portion 42b and are electrically connected to the wiring lines of the FPC. A metal plate 45b functioning as a reinforcing plate is bonded to the base portion 42b. The metal plate 45b and the base portion 42b are bent to substantially L-shaped. The base portion 42b is arranged along and aligned with the base portion 42a of the first FPC unit 21a and is installed on the bottom wall 12a of the base 12. The relay portion 44b extends from the side edge of the base portion 42b toward the second actuator assembly 22B. The connecting portion 46b provided at the extending end of the relay portion 44b is bonded to one side surface (mounting surface) of the second actuator block 29 via a lining plate 43b and is fixed to the mounting surface by a fixing screw.

The connecting portion 46b has a rectangular shape slightly smaller than the mounting surface of the second actuator block 29. The connecting portion 46b comprises seven connecting pad groups 60 corresponding to the connecting end portions 75 of the flexures 74. Each connecting pad group 60 comprises, for example, nine connecting pads 61 arranged in line. Each connecting pad 61 is electrically connected to the base portion 42b via the wiring line of the FPC. A head IC (head amplifier) 48 is mounted on the connecting portion 46b, and the head IC 48 is connected to the connecting pads 61 and the base portion 42 via wiring lines. Furthermore, the connecting portion 46b comprises connecting pads 49 connected to the voice coil 36.

As shown in FIGS. 2 and 3, the connecting end portion 75 of each flexure of the second actuator assembly 22B is overlaid on the corresponding connecting pad group 60 of the connecting portion 46a, and nine connecting terminals 78 of the connecting end portion 75 are electrically and mechanically connected to the corresponding connecting pads 61 by solder.

Consequently, seven magnetic heads 17 of the second actuator assembly 22B are electrically connected to the base portion 42b via the wiring lines of the flexures 74, the connecting end portions 75, the connecting portion 46b of the second FPC unit 21b, and the relay portion 44b. Furthermore, the base portion 42b is electrically connected to the printed circuit board on the bottom surface side of the housing 10 via the conversion connector 47b.

Next, a method for assembling the HDD and the head actuator assembly configured as described above will be described.

FIGS. 8A to 8E are perspective views showing the assembling steps of the second actuator assembly 22B.

Figure 8A:
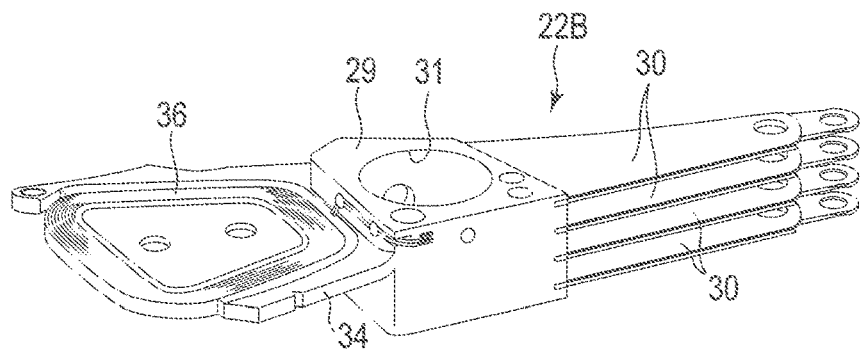
FIG. 8A is a perspective view showing an assembling step of the first actuator assembly.
Figure 8B:
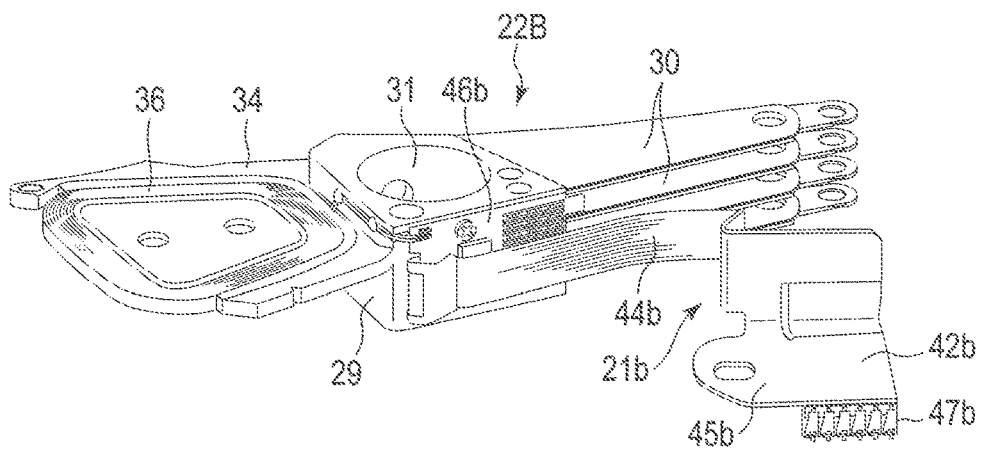
FIG. 8B is a perspective view showing an assembling step of the first actuator assembly.

As shown in FIG. 8A, firstly, the second actuator block 29 and the arms 30 in a state where the second bearing unit and the head suspension assemblies are not mounted are prepared, and the voice coil 36 is fixed to the frame 34.

Subsequently, as shown in FIG. 83, the second FPC unit 21b is prepared, and the connecting portion 46b and the lining plate 43b are bonded to and screwed on the mounting surface of the second actuator block 29.

Figure 8C:
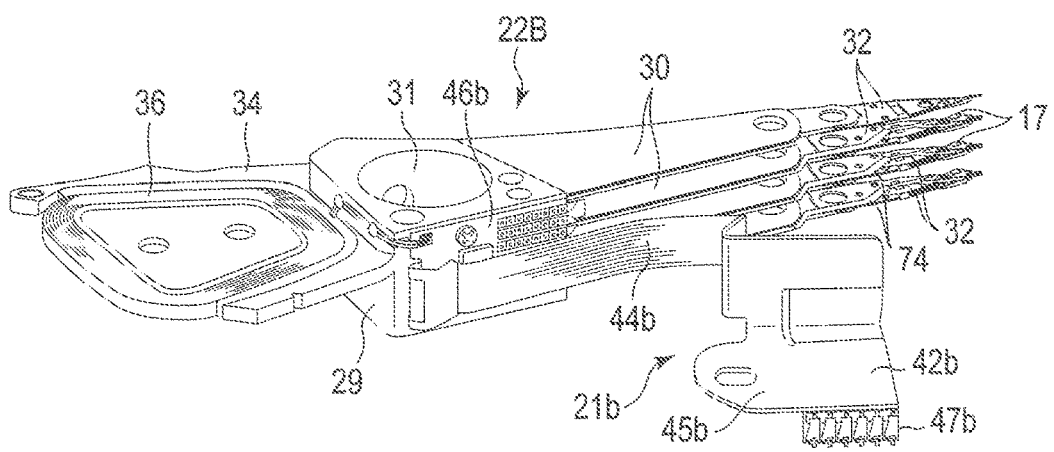
FIG. 8C is a perspective view showing an assembling step of the first actuator assembly.

Next, as shown in FIG. 8C, the head suspension assemblies 32 are mounted on the distal ends of the arms 30, and the connecting end portions 75 of the flexures 74 are connected to the pad groups of the connecting portion 46b. After that, the assembled assemblies are cleaned.

After the cleaning, the second bearing unit 50b is fitted in the inner hole 31 of the second actuator block 29 and mounted in the second actuator block 29 as shown in FIG. 8D.

As shown in FIG. 8E, the second actuator assembly 22B and the second FPC unit 21b assembled as described above are incorporated into the base 12. That is, the second bearing unit 50b is mounted on the support shaft 26 of the base 12, and the second actuator assembly 22B is supported so as to be rotatable around the support shaft 26. In addition, the base portion 42b of the second FPC unit 21b is screwed on the bottom wall 12a of the base 12. Note that the fixing of the base portion 42b may be concurrently performed with the fixing of the base portion 42a of the first FPC unit 21a after the first actuator assembly 22A which will be described later is incorporated.

After or while the second actuator assembly 22B is assembled, the first actuator assembly 22A is assembled.

Figure 8F:
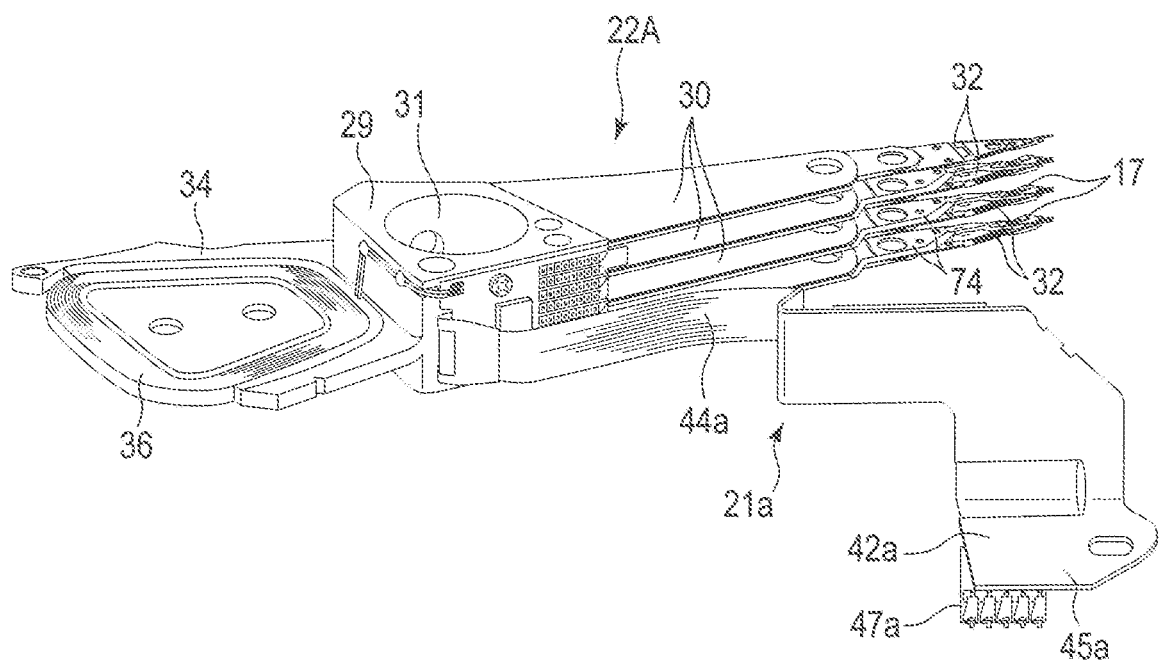
FIG. 8F is a perspective view showing an assembling step of the second actuator assembly.

As shown in FIG. 8F, the first actuator block 29 in a state where the first bearing unit and the head suspension assemblies are not mounted is prepared, and the voice coil 36 is fixed to the frame 34.

Subsequently, the first FPC unit 21a is prepared, and the connecting portion 46a and the lining plate 43a are bonded to and screwed on the mounting surface of the first actuator block 29. After the head suspension assemblies 32 are mounted on the distal ends of the arms 30, the connecting end portions 75 of the flexures 74 are connected to the pad groups of the connecting portion 46a. After that, the assembled assemblies are cleaned.

Figure 8G:
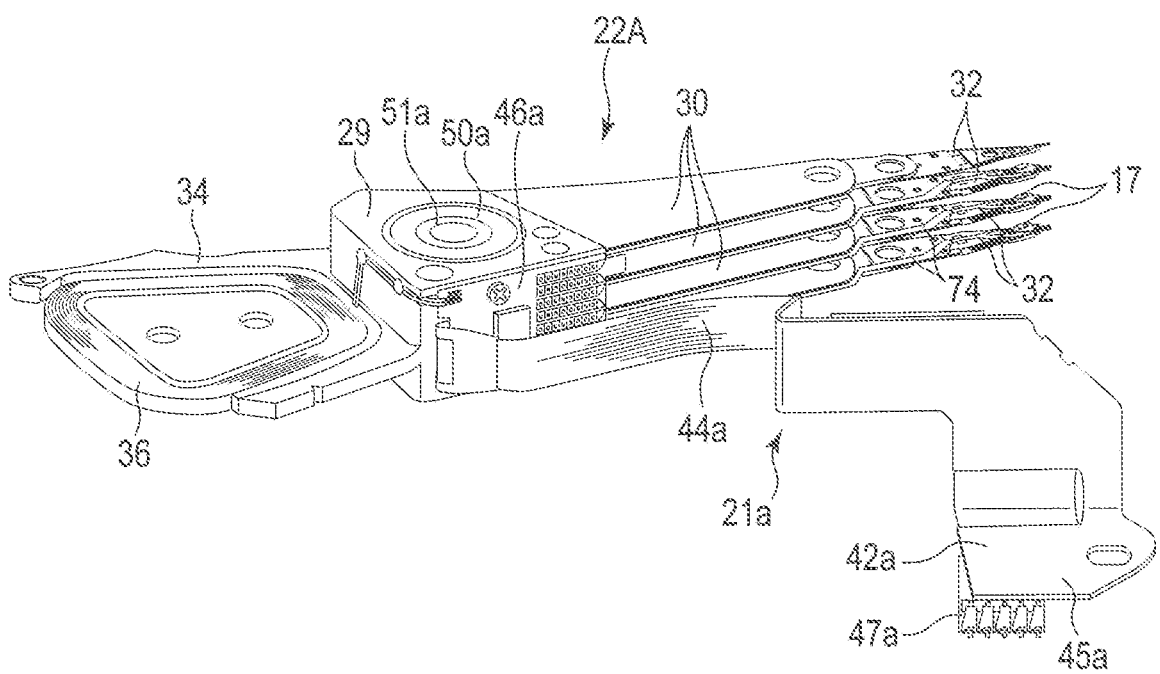
FIG. 8G is a perspective view showing an assembling step of the second actuator assembly.

After the cleaning, the first bearing unit 50a is fitted in the inner hole 31 of the first actuator block 29 and mounted in the first actuator block 29 as shown in FIG. 8G.

Figure 8H:
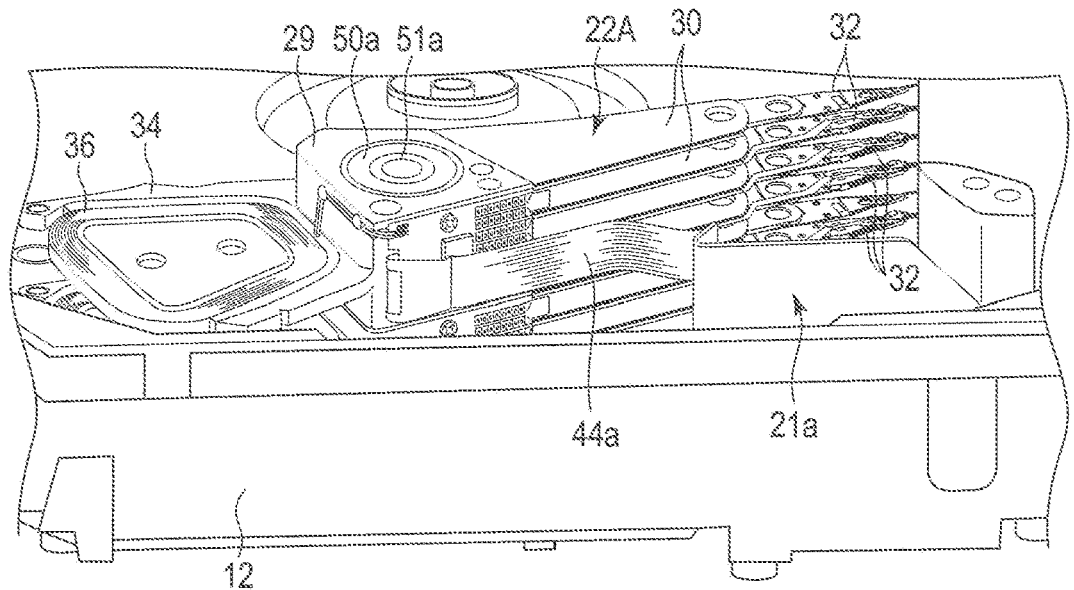
FIG. 8H is a perspective view showing an assembling step of the second actuator assembly.

As shown in FIG. 8H, the first actuator assembly 22A and the first FPC unit 21a assembled as described above are incorporated into the base 12. That is, the first bearing unit 50a is mounted on the support shaft 26 of the base 12, and the first actuator assembly 22A is supported so as to be rotatable around the support shaft 26. After the first bearing unit 50a is mounted on the upper half of the support shaft 26, the fixing screw 60 is screwed to the support shaft 26, and the first bearing unit 50a and the second bearing unit 50b are located and fixed at predetermined positions of the support shaft 26.

In addition, the base portion 42a of the first FPC unit 21a is screwed on the bottom wall 12a of the base 12. Note that the fixing of the base portion 42a may be concurrently performed with the fixing of the base portion 42b of the second FPC unit 21b described above.

Consequently, the assembling and incorporation into the base 12 of the split actuator assembly ends.

According to the HDD and the actuator assembly of the first embodiment configured as described above, the first bearing unit 50a and the second bearing unit 50b of the actuator assemblies comprise the independent first hollow shaft and the independent second hollow shaft, and are constituted as completely separate independent bearing units, respectively. Therefore, at the time of assembling the actuator assemblies, the first actuator assembly 22A and the second actuator assembly 22B can be separately assembled. Consequently, the adjustment of the gap between the upper and lower actuator assemblies can be excluded. As a result, assembling, dissembling and management become easy.

In addition, according to the embodiment, the FPC unit is completely split into the first FPC unit 21a for the first actuator assembly 22A and the second FPC unit 21b for the second actuator assembly 22B. Therefore, the upper and lower actuator assemblies can be assembled through steps similar to conventional steps. Consequently, assembling and management become easy. Furthermore, after the FPC unit is fixed to the actuator block, cleaning is performed, and the bearing unit is assembled at the end. Consequently, components can be kept clean.

As described above, according to the first embodiment, a disk device improved in workability of assembling can be provided.

Next, modification examples of the bearing unit and modification examples of the FPC unit will be described. In the modification examples described below, the same portions as those of the first embodiment will be denoted by the same reference numbers and detailed description thereof will be omitted or simplified, and different portions from the first embodiment will be mainly described.

First Modification Example

Figure 9:
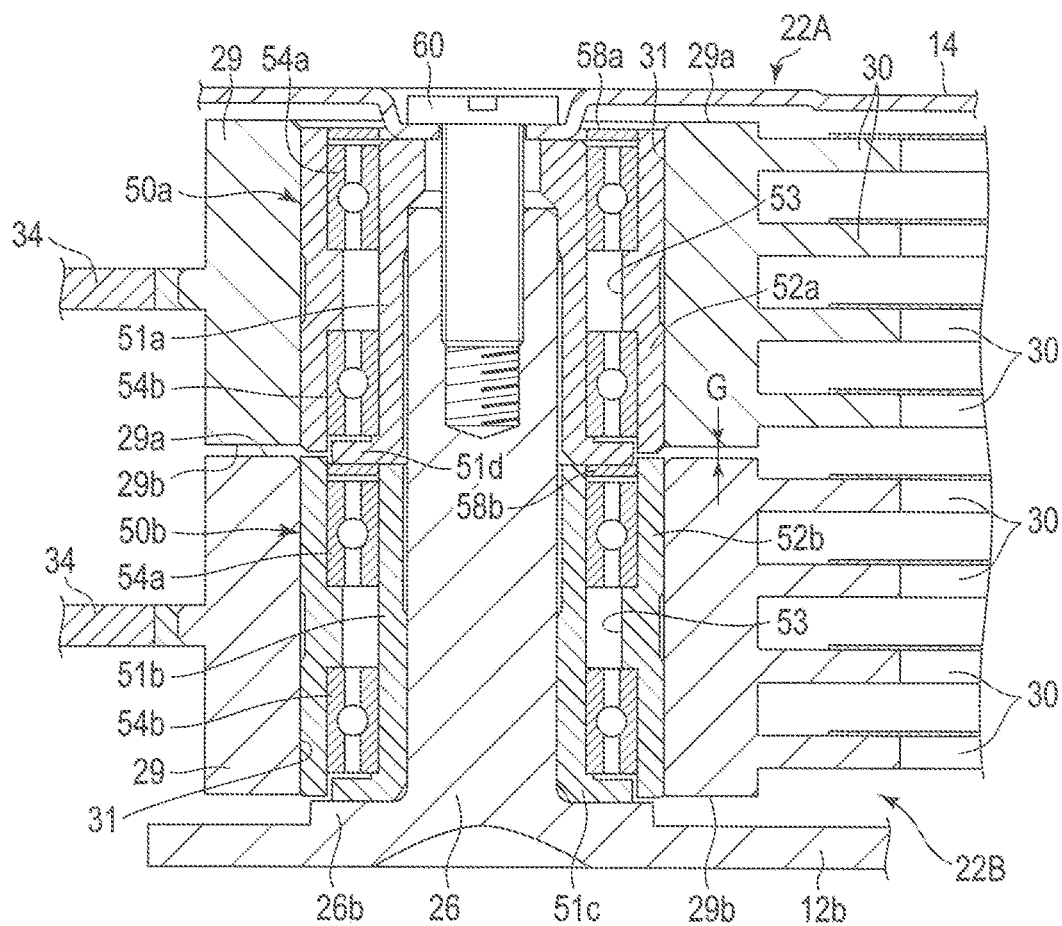
FIG. 9 is a cross-sectional view showing an actuator block and a bearing unit portion of an actuator assembly according to the first modification example.

FIG. 9 is a cross-sectional view showing a bearing unit of an actuator assembly according to the first modification example.

As shown in FIG. 9, according to the first modification, the first hollow shaft 51a of the first bearing unit 50a integrally comprises an annular flange 51d provided in the lower end portion in the axial direction. The flange 51d is in contact with the upper end in the axial direction of the second hollow shaft 51b of the second bearing unit 50b and the cap 58b, and determines the position of the first bearing unit 50a with respect to the second bearing unit 50b. The flange 51d faces the lower ball bearing 54b across a small gap. The flange 51d functions as a cover which prevents scattering of grease from the ball bearing 54b. Furthermore, the flange 51d forms a labyrinth structure by a gap between the flange 51d and the lower ball bearing 54b, between the flange 51d and the lower end portion of the first sleeve 52a, and between the flange 51d and the upper end portion of the second sleeve 52b. The labyrinth reliably prevents scattering of grease from the boundary between the first bearing unit 50a and the second bearing unit 50b.

In the first modification example, the other structures of the first bearing unit and the second bearing unit are the same as those of the bearing units in the first embodiment described above.

Second Modification Example

Figure 10:
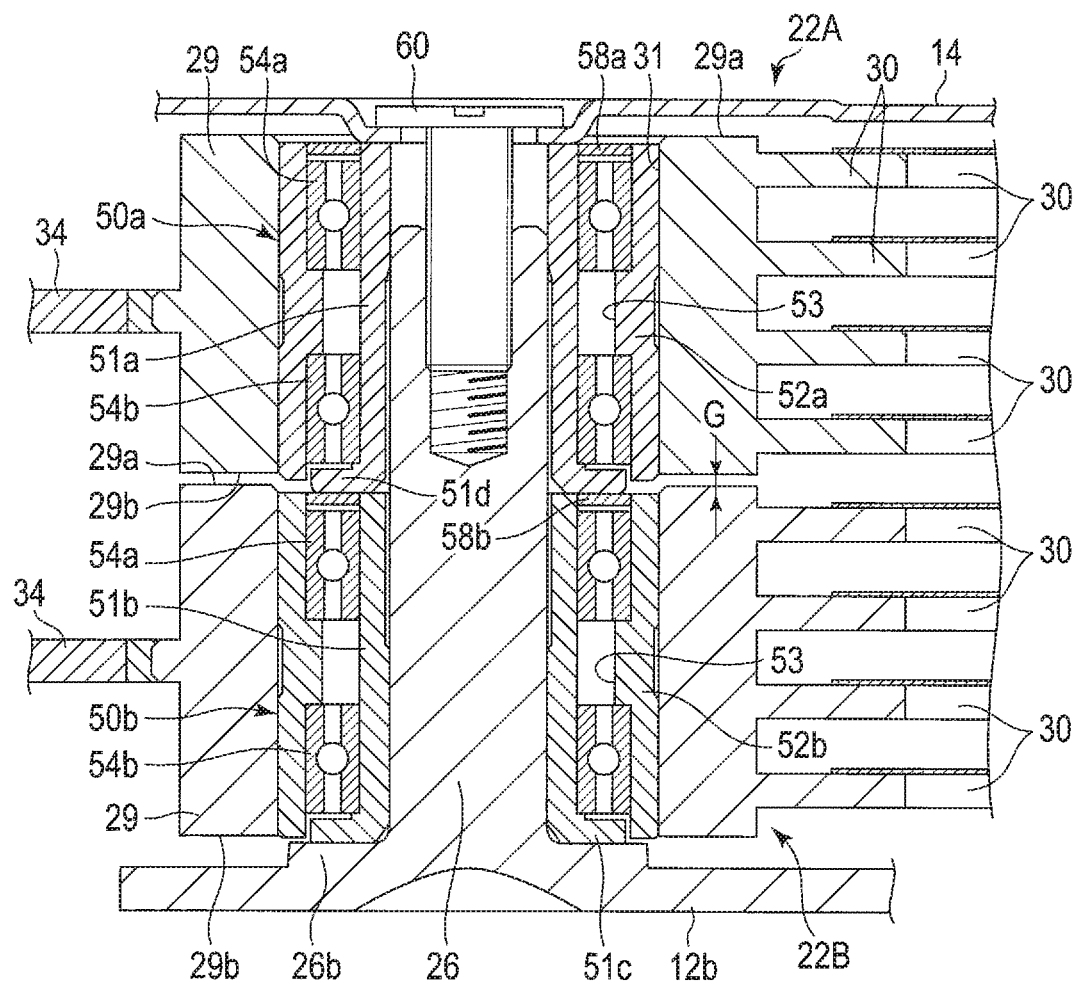
FIG. 10 is a cross-sectional view showing an actuator block and a bearing unit portion of an actuator assembly according to the second modification example.

FIG. 10 is a cross-sectional view showing a bearing unit of an actuator assembly according to the second modification example.

As shown in the drawing, according to the second modification, the first hollow shaft 51a of the first bearing unit 50a integrally comprises the annular flange 51d provided in the lower end portion in the axial direction. The upper end portion in the axial direction of the first hollow shaft 51a has an inner diameter equal to the inner diameter of the other portion of the first hollow shaft 51a. In addition, by extending the length of the first hollow shaft 51a or shortening the length in the axial direction of the first sleeve 52a, the upper end in the axial direction of the first hollow shaft 51a and the upper end in the axial direction of the first sleeve 52a are aligned with each other in the height direction.

Consequently, the first bearing unit 50a and the second bearing unit 50b have substantially the same structure and the same shape, and components can be shared between them. At the same time, interference between the first and second bearing units 50a and 50b can be eliminated, and the first actuator assembly 22A and the second actuator assembly 22B can be smoothly operated.

Third Modification Example

Figure 11:
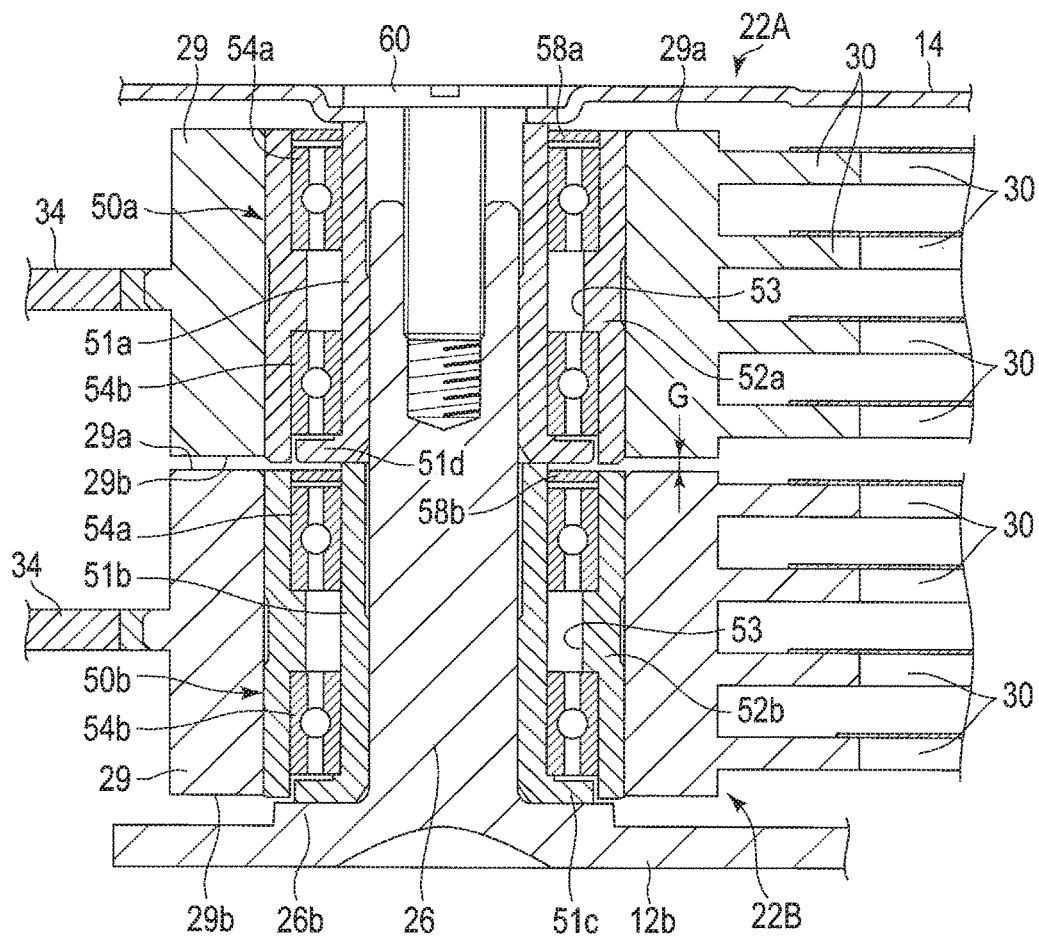
FIG. 11 is a cross-sectional view showing an actuator block and a bearing unit portion of an actuator assembly according to the third modification example.

FIG. 11 is a cross-sectional view showing a bearing unit of an actuator assembly according to the third modification example.

As shown in the drawing, according to the third modification, the first hollow shaft 51a of the first bearing unit 50a integrally comprises the annular flange 51d provided in the lower end portion in the axial direction. The upper end portion in the axial direction of the first hollow shaft 51a has an inner diameter equal to the inner diameter of the other portion of the first hollow shaft 51a. Furthermore, the upper end in the axial direction of the first hollow shaft 51a slightly projects upward from the upper end in the axial direction of the first sleeve 52a. In contrast, the lower end in the axial direction of the first sleeve 52a is aligned with the lower end in the axial direction of the first hollow shaft 51a.

The second bearing unit 50b has the same structure, the same shape and the same dimensions as the first bearing unit 50a. The upper end portion in the axial direction of the second hollow shaft 51b slightly projects upward from the upper end in the axial direction of the second sleeve 52b and is in contact with the lower end in the axial direction of the first hollow shaft 51a.

Also in the third modification example configured as described above, the first bearing unit 50a and the second bearing unit 50b have substantially the same structure, the same shape and the same dimensions, and components can be shared between them. At the same time, interference between the first and second bearing units 50a and 50b can be eliminated, and the first actuator assembly 22A and the second actuator assembly 22B can be smoothly operated.

Fourth Modification Example

Figure 12:
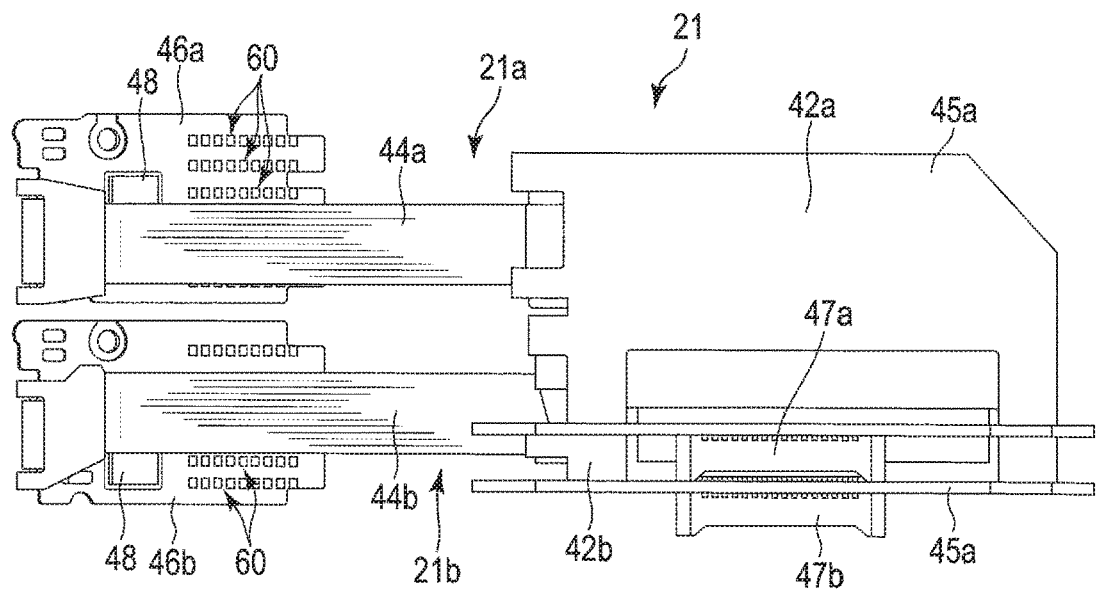
FIG. 12 is a side view showing an FPC unit of an actuator assembly according to the fourth modification example.

FIG. 12 is a side view of an FPC unit according to the fourth modification example, and FIG. 13 is a perspective view showing the rear surface side of the FPC unit.

In the first embodiment described above, the base portion 42a of the first FPC unit 21a and the base portion 42b of the second FPC unit 21b are provided in substantially the same plane. As shown in FIGS. 12 and 13, according to the fourth modification example, the base portion 42a and the metal plate 45a of the first FPC unit 21a and the base portion 42b and the metal plate 45b of the second FPC unit 21b have substantially the same shape, the same structure and the same dimensions. The base portion 42a and the metal plate 45a have a rectangular shape and are bent at a right angle at a central portion in the width direction. The conversion connector 47a is mounted on a horizontal portion of the base portion 42a (portion facing the bottom wall 12a of the base).

Similarly, the base portion 42b and the metal plate 45b of the second FPC unit 21b have a substantially rectangular shape and are bent at a right angle at a central portion in the width direction. The conversion connector 47b is mounted on a horizontal portion of the base portion 42b (portion facing the bottom wall 12a of the base).

The base portion 42a and the metal plate 45a of the first FPC unit 21a are arranged so as to overlap the base portion 42b and the metal plate 45b of the second FPC unit 21b in the height direction (direction perpendicular to the bottom wall 12a). That is, the horizontal portions of the base portion 42a and the metal plate 45a, and the conversion connector 47a are arranged so as to overlap the horizontal portions of the base portion 42b and the metal plate 45b, and the conversion connector 47a is connected to the conversion connector 47b of the second FPC unit 21b from above. In addition, the perpendicular portions of the base portion 42a and the metal plate 45a are arranged so as to partially overlap the perpendicular portions of the base portion 42b and the metal plate 45b in the thickness direction.

As described above, according to the fourth modification example, as the first FPC unit 21a and the second FPC unit 21b, which are independent of each other, are provided, the upper and lower actuator assemblies can be assembled through steps similar to conventional steps. Therefore, assembling and management become easy.

Fifth Modification Example

Figure 14:
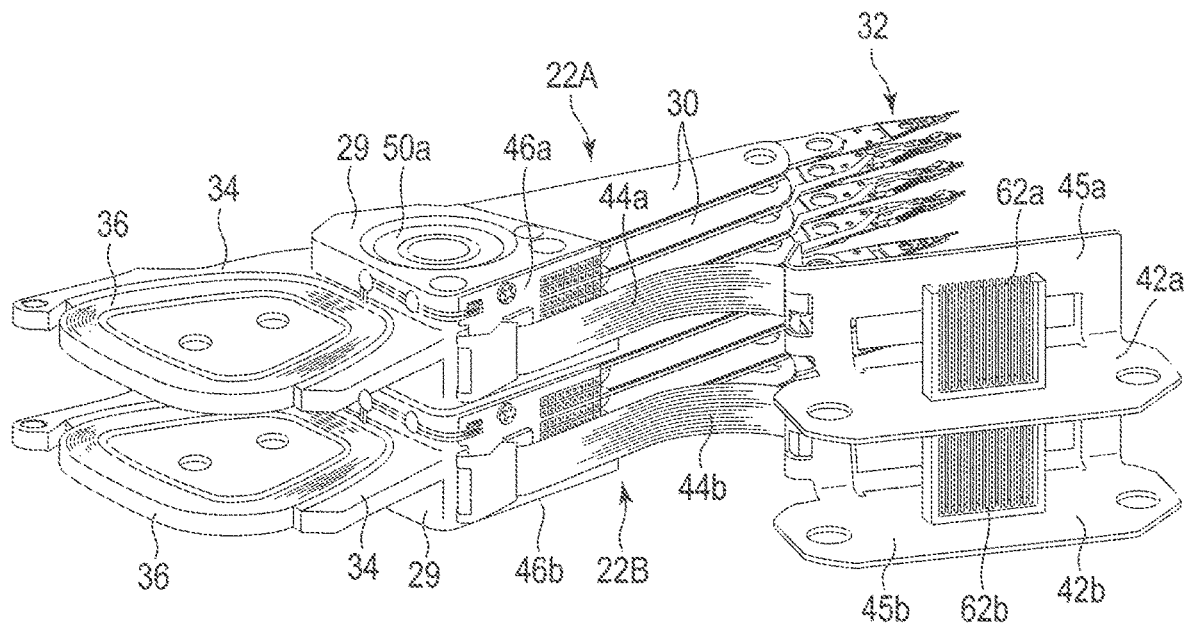
FIG. 14 is a side view showing an FPC unit of an actuator assembly according to the fifth modification example.
Figure 15:
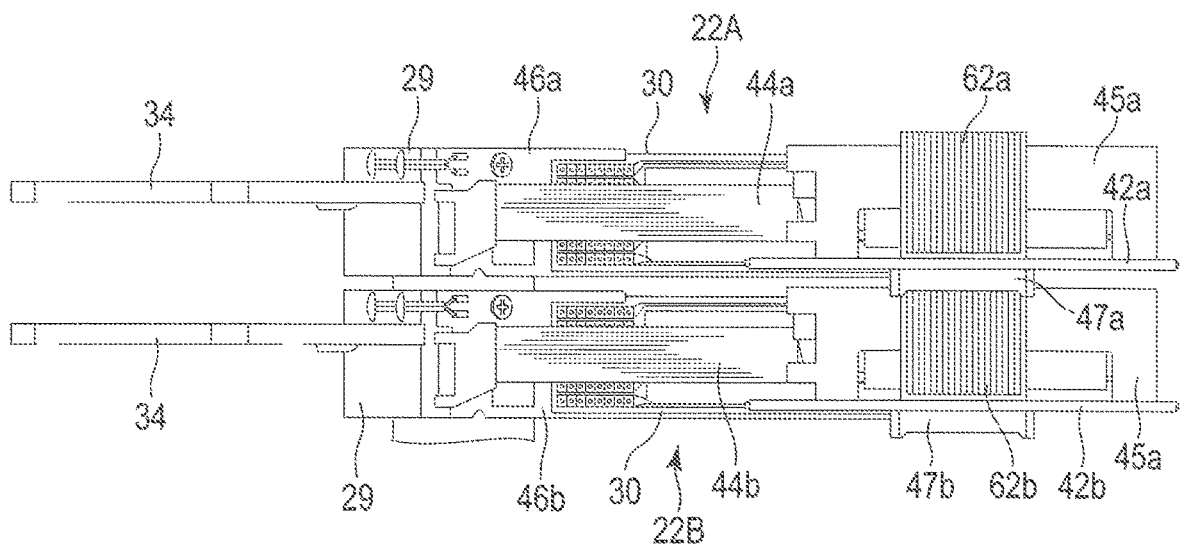
FIG. 15 is a perspective view showing the FPC unit of the actuator assembly according to the fifth modification example.

FIG. 14 is a perspective view of a head actuator assembly comprising an FPC unit according to the fifth modification example, and FIG. 15 is a side view of the head actuator assembly.

According to the fifth modification example, as compared to the fourth modification example described above, the first FPC unit 21a and the second FPC unit 21b further comprise a relay connector 62a and a relay connector 62b, respectively. The relay connector 62a is mounted on the base portion 42a of the first FPC unit 21a, and is arranged so as to face the converter connector 47a, that is, arranged on the opposite side to the conversion connector 47a. The relay connector 62a is electrically connected to the conversion connector 47a via wiring lines (not shown).

The relay connector 62b is mounted on the base portion 42b of the second FPC unit 21b, and is arranged so as to face the conversion connector 47b, that is, arranged on the opposite side to the conversion connector 47b. The relay connector 62b is electrically connected to the conversion connector 47b via wiring lines (not shown).

The horizontal portions of the base portion 42a and the metal plate 45a of the first FPC unit 21a, and the conversion connector 47a are arranged so as to overlap the horizontal portions of the base portion 42b and the metal plate 45b of the second FPC unit 21b in the height direction. The conversion connector 47a is connected to the relay connector 62b of the second FPC unit 21b and is electrically connected to the conversion connector 47b via the relay connector 62b.

Since the gap (height) between the base portion 42a and the base portion 42b is sufficiently secured by the relay connector 62b, the perpendicular portions of the base portion 42a and the metal plate 45a and the perpendicular portions of the base portion 42b and the metal plate 45b do not overlap each other in the thickness direction and are aligned with each other in the height direction.

In the fifth modification example, the other structures of the FPC unit are the same as those of the fourth modification example. Also in the fifth modification example, the same effects as those of the fourth modification example described above can be obtained. In addition, as the relay connector is provided, the base portion and the metal plate can be miniaturized, accordingly.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The head actuator assembly is not necessarily split into two head actuator assemblies, that is, the first and second head actuator assemblies and can be split into three or more actuator assemblies. The number of magnetic disks is not limited to seven and may be eight or more or six or less, and the number of head suspension assemblies and the number of magnetic heads can be increased or decreased according to the number of magnetic disks installed. In the connecting end portion of the flexure, the number of connecting terminals is not limited to nine and can be increased or decreased as needed. The materials, shapes, sizes, etc., of elements which constitute the disk device are not limited to those described in the embodiment and can be variously changed as needed.

What is claimed is:

1. A disk device comprising:
a plurality of disk-shaped recording media;
a first actuator assembly comprising a first bearing unit, a first actuator block rotatably supported on a support shaft via the first bearing unit, arms and suspension assemblies extending from the first actuator block, and magnetic heads supported on the suspension assemblies; and
a second actuator assembly comprising a second bearing unit, a second actuator block rotatably supported on the support shaft via the second bearing unit, arms and suspension assemblies extending from the second actuator block, and magnetic heads supported on the suspension assemblies, wherein
the first bearing unit comprises a first shaft mounted on the support shaft, a first sleeve fixed to the first actuator block and provided around the first shaft, and at least one bearing arranged between the first shaft and the first sleeve,
the second bearing unit comprises a second shaft mounted on the support shaft and separated from the first shaft, a second sleeve fixed to the second actuator block and arranged around the second shaft, and at least one bearing arranged between the second shaft and the second sleeve,
one end in an axial direction of the first shaft faces one end in an axial direction of the second shaft, and
the one end in the axial direction of the first shaft projects further toward the second bearing unit than one end in an axial direction of the first sleeve and is in contact with the one end in the axial direction of the second shaft.

2. The disk device of claim 1, wherein the first shaft comprises an annular flange provided in the one end in the axial direction, and the flange faces one end of the second bearing unit across a gap and constitutes a labyrinth by the gap.

3. The disk device of claim 1, wherein
the first shaft and the first sleeve of the first bearing unit have substantially the same shapes and diameters as the second shaft and the second sleeve of the second bearing unit, respectively, and
the first sleeve is shorter than the second sleeve in an axial direction and faces one end in the axial direction of the second sleeve with a gap.

4. The disk device of claim 1, wherein the one end in the axial direction of the second shaft projects further toward the first bearing unit than one end in an axial direction of the second sleeve, and is in contact with the one end in the axial direction of the first shaft.

5. A disk device comprising:
a plurality of disk-shaped recording media;
a first actuator assembly comprising a first bearing unit, a first actuator block rotatably supported on a support shaft via the first bearing unit, arms and suspension assemblies extending from the first actuator block, and magnetic heads supported on the suspension assemblies;
a second actuator assembly comprising a second bearing unit, a second actuator block rotatably supported on the support shaft via the second bearing unit, arms and suspension assemblies extending from the second actuator block, and magnetic heads supported on the suspension assemblies, a first wiring substrate unit comprising a first base portion, a first relay portion extending from the first base portion, and a first connecting portion continuously provided at an extending end of the first relay portion and mounted on the first actuator block of the first actuator assembly, and integrally formed of a flexible wiring substrate; and a second wiring substrate unit comprising a second base portion separated from the first base portion, a second relay portion extending from the second base portion, and a second connecting portion continuously provided at an extending end of the second relay portion and mounted on the second actuator block of the second actuator assembly, and integrally formed of a flexible wiring substrate; wherein the first bearing unit comprises a first shaft mounted on the support shaft, a first sleeve fixed to the first actuator block and provided around the first shaft, and at least one bearing arranged between the first shaft and the first sleeve, the second bearing unit comprises a second shaft mounted on the support shaft and separated from the first shaft, a second sleeve fixed to the second actuator block and arranged around the second shaft, and at least one bearing arranged between the second shaft and the second sleeve, and one end in an axial direction of the first shaft faces one end in an axial direction of the second shaft.

6. The disk device of claim 5, wherein the first wiring substrate unit comprises a first connector mounted on the first base portion, the second wiring substrate comprises a second connector mounted on the second base portion, and the first base portion and the first connector and the second base portion and the second connector are arranged in a surface direction.

7. The disk device of claim 5, wherein the first wiring substrate unit comprises a first connector mounted on the first base portion, the second wiring substrate comprises a second connector mounted on the second base portion, the first base portion and the first connector and the second base portion and the second connector are arranged one on top of the other, and the first connector is connected to the second connector.

8. The disk device of claim 7, wherein the second wiring substrate comprises a relay connector connected between the first connector and the second connector.

* * * * *